(12) United States Patent
Banik et al.

(10) Patent No.: US 12,124,856 B2
(45) Date of Patent: Oct. 22, 2024

(54) PLATFORM HARDENING FOR BOOTLOADERS VIA REFERENCE FIRMWARE

(71) Applicant: Intel Corporation, Santa Clara, CA (US)

(72) Inventors: Subrata Banik, Bangalore (IN); Aamir Bohra, Bangalore (IN); Vincent Zimmer, Issaquah, WA (US); Robert E. Gough, Sherwood, OR (US); Xiang Ma, Portland, OR (US); Jabeena Begum Gaibusab, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 17/211,549

(22) Filed: Mar. 24, 2021

(65) Prior Publication Data
US 2021/0208901 A1    Jul. 8, 2021

(51) Int. Cl.
*G06F 9/4401* (2018.01)
*G06F 8/65* (2018.01)
*G06F 15/78* (2006.01)
*G06F 21/57* (2013.01)

(52) U.S. Cl.
CPC ........ *G06F 9/4411* (2013.01); *G06F 15/7807* (2013.01); *G06F 8/65* (2013.01); *G06F 9/4401* (2013.01); *G06F 21/572* (2013.01)

(58) Field of Classification Search
CPC ...... G06F 15/7807; G06F 21/572; G06F 8/65; G06F 9/4401; G06F 9/4411
See application file for complete search history.

(56) References Cited

U.S. PATENT DOCUMENTS 10,635,607 B2   4/2020   Chaganty et al.
10,885,199 B2   1/2021   Yao et al.
2004/0243534 A1*  12/2004   Culter ................... G06F 9/4411
(Continued)

OTHER PUBLICATIONS

Wong, Swee Heng, et al.; "Intel Firmware Support Package for Intel Architecture," Intel White Paper, 2014; 6 pages.
(Continued)

*Primary Examiner* — Terrell S Johnson
(74) *Attorney, Agent, or Firm* — Alliance IP, LLC

(57) ABSTRACT

During a computing system boot sequence, reference firmware provided by a computing system component supplies Advanced Configuration and Power Interface (ACPI) code that generates ACPI tables and definition blocks to a bootloader. During a boot sequence, the reference firmware receives an indication from the bootloader which components the reference firmware is to initialize. As part of component initialization performed by the reference firmware, the reference firmware populates hand-off data structures (e.g., hand-off blocks (HOBs)) with ACPI code (AML code) that, when executed by the bootloader, generates and populates ACPI tables (e.g., DSDT and SSDT tables) and definition blocks with information pertinent to the initialization and runtime management of computing system components. Component initialization and runtime configuration workarounds can be implemented in the bootloader incorporating reference firmware updates provided by the component vendor.

25 Claims, 5 Drawing Sheets

(56) References Cited

U.S. PATENT DOCUMENTS

| | | | | |
|---|---|---|---|---|
| 2006/0282651 A1* | 12/2006 | Hobson | ................ | G06F 9/4411 |
| | | | | 713/1 |
| 2019/0026118 A1* | 1/2019 | Warkentin | .............. | G06F 8/656 |
| 2021/0240490 A1* | 8/2021 | Chaiken | .............. | G06F 9/45558 |

OTHER PUBLICATIONS

EPO Communication Pursuant to Article 94(3) EPC in EP Application Serial No. 22153628.7 mailed on Jul. 26, 2024 (5 pages).

* cited by examiner

INDICATE, TO REFERENCE FIRMWARE, COMPONENTS TO BE INITIALIZED DURING COMPUTING SYSTEM BOOT SEQUENCE
310

PASS, TO BOOTLOADER, HAND-OFF DATA STRUCTURES COMPRISING AML CODE ASSOCIATED WITH COMPONENTS TO BE INITIALIZED
320

EXECUTE, BY BOOTLOADER, AML CODE ASSOCIATED WITH COMPONENTS TO GENERATE ACPI DATA STRUCTURES ASSOCIATED WITH COMPONENTS
330

PLATFORM HARDENING FOR BOOTLOADERS VIA REFERENCE FIRMWARE

BACKGROUND

The Advanced Configuration and Power Interface (ACPI) standard provides an interface between the operating system and firmware of a computing system. During a computing system boot sequence, a bootloader initializes computing system components and generates ACPI data structures (e.g., tables and definition blocks). The operating system utilizes the ACPI data structures for component-level and platform-level management of the computing system.

DETAILED DESCRIPTION

Figure 1:
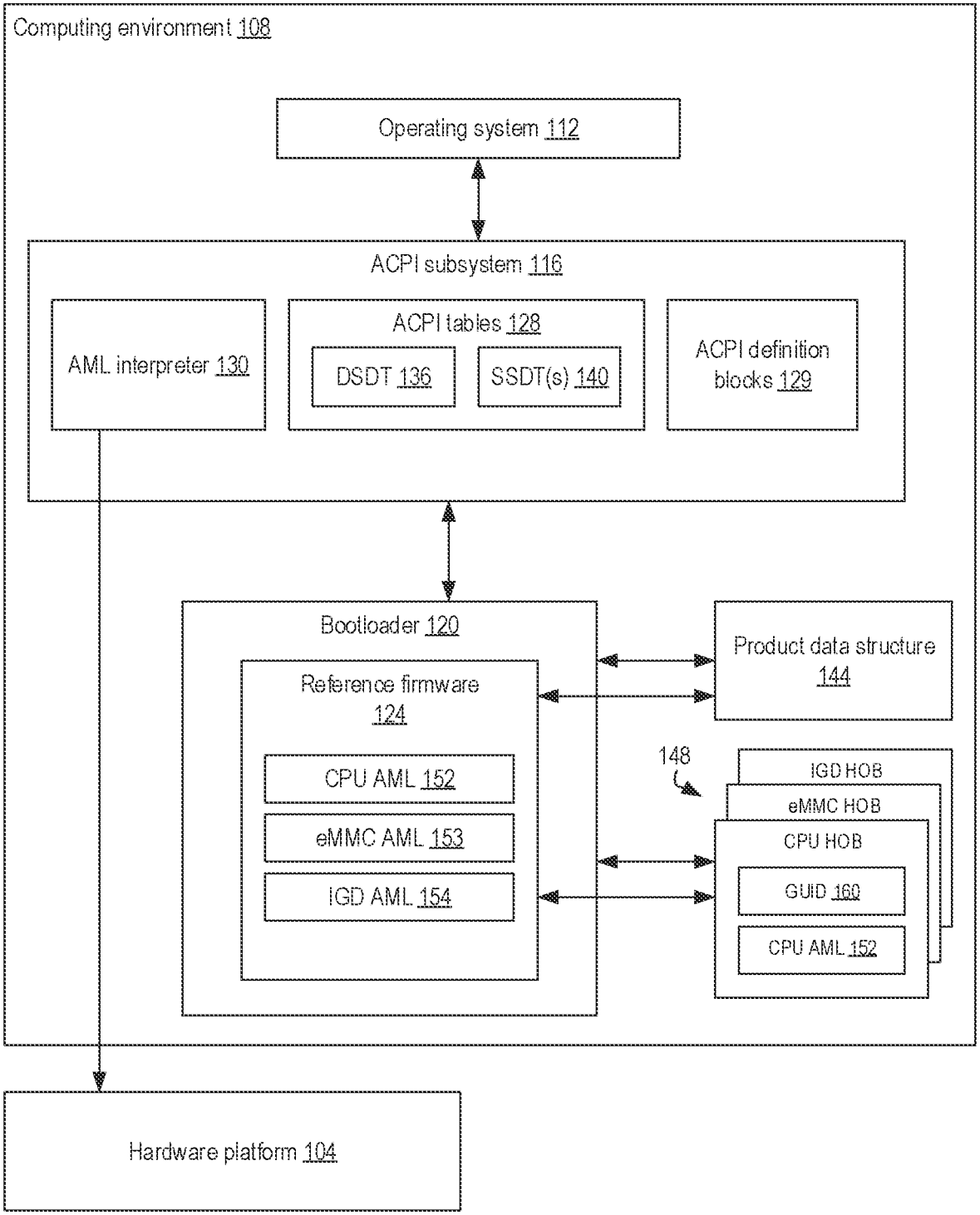
FIG. 1 illustrates an example computing system for platform hardening for bootloaders via reference firmware.

In some computing systems, the Advanced Configuration and Power Interface (ACPI) standard is used by an operating system, hypervisor, or virtual machine monitor to discover and configure computing system components during a boot sequence and to perform power management, automatic component and platform configuration, and monitor the status of system components during runtime. ACPI is an open source standard that defines various data structures that allow an ACPI-compliant operating system to interface with computing system firmware. These ACPI data structures include ACPI tables, which include a Differentiated System Description Table (DSDT) and one or more optional Secondary System Description Tables (SSDTs) that describe computing system components that can be managed via the ACPI framework. The DSDT is created during a computing system boot sequence. SSDTs are a continuation of the DSDT and can be created during a boot sequence as well, but they can also be created while a computing system is operating, such as when a device is plugged into an operating computing system.

ACPI tables are generated during a boot sequence by bootloader firmware (e.g., Basic Input/Output System (BIOS), Unified Extensible Firmware Interface (UEFI), coreboot, Intel® Slim Bootloader). In some computing systems, the bootloader comprises firmware provided by the vendor of a computing system component to initialize the component during boot. An ACPI-compliant bootloader can be written ACPI source language (ASL) code and compiled into executable ACPI machine language (AML) code (e.g., bytecode). Bootloaders can be developed by various entities downstream from component vendors in the supply chain, such as original equipment manufacturers (OEMs), original design manufacturers (ODMs), and independent BIOS vendors (IBVs).

As used herein, the term "computing system component" can refer to an integrated circuit component, such as a system on a chip (SoC), chipset processor, XPU or xPU (e.g., central processor unit (CPU), graphics processor unit (GPU), general-purpose GPU (GPGPU), accelerator processor unit (APU)), an I/O device (e.g., trackpad, touch display, camera, memory stick), a platform-level component (e.g., fan); or any other component included in or a peripheral of a computing system.

As used herein, the term "bootloader developer" refers to an entity that develops or provides a bootloader for a computing system.

As used herein, the term "firmware" refers to computer-executable instructions stored on one or more non-transitory computer-readable media, such as flash memory (e.g., serial NOR flash), solid-state drives, random-access memories (e.g., SRAM, DRAM), or any other non-transitory computer-readable media described or referenced herein. As used herein, the terms "initialize" and "configure" are interchangeable in the context of a boot sequence or the execution of firmware in response to the addition of a component or device to a computing system during runtime.

As used herein, the term "integrated circuit component" refers to a packaged or unpacked integrated circuit product. A packaged integrated circuit component comprises one or more integrated circuits mounted on a package substrate. In one example, a packaged integrated circuit component contains one or more processor units mounted on a substrate, with an exterior surface of the substrate comprising a solder ball grid array (BGA). In one example of an unpackaged integrated circuit component, a single monolithic integrated circuit die comprises solder bumps attached to contacts on the die. The solder bumps allow the die to be directly attached to a printed circuit board. An integrated circuit component can comprise one or more of any computing system component described or referenced herein, such as a processor unit (e.g., system-on-a-chip (SoC), processor cores, graphics processor unit (GPU), accelerator), I/O controller, chipset processor, memory, or network interface controller.

As used herein, the terms "operating", "executing", or "running" as they pertain to software or firmware in relation to a system, device, machine, platform, or resource are used interchangeably and can refer to software or firmware stored in one or more computer-readable storage media accessible by the system, device, machine, platform or resource, even though the software or firmware instructions are not actively being executed by the system, device, machine, platform, or resource.

The platform hardening for bootloaders via reference firmware described herein may overcome shortcomings of existing bootloader/firmware ecosystems. For example, some existing bootloader/firmware ecosystems make the generation of reliable bootloaders problematic. First, computing system component vendors may provide firmware that does not generate ACPI tables and definition blocks during boot to manage the component. The vendor may provide input to the bootloader vendor on what ACPI data structures are be generated during boot and what those ACPI data structures are to contain. but it is up to the bootloader developer to write the bootloader firmware that generates and populates the ACPI data structures. Given that bootloaders are typically manually developed, production bootloaders may contain errors that result in improperly populated ACPI data structures. In many cases, DSDT and SSDT ACPI tables comprise component-specific configurations, power management recommendations, and workarounds for component bugs or operating system shortcomings. As such, these ACPI tables are important to ensure stable computing system operation and desired power consumption behavior. A single misconfiguration in an ACPI table can cause platform stability issues, such as the lack of platform or component availability or placing the computing system into an unvalidated or unexpected state.

Second, some production bootloaders may not verify or authenticate vendor-supplied firmware prior to the vendor-supplied firmware being executed during a boot sequence. Thus, changes made to the vendor-supplied firmware, due to malicious activity, error, or otherwise, may go undetected.

Third, component vendors are likely reluctant to provide firmware to open source projects (e.g., coreboot, Intel® Slim bootloader) that reveal details of restricted register sets or other proprietary features in the form of source code or documentation. This can hinder the adoption of a vendor's components.

Disclosed herein are technologies that overcome these shortcomings. During a boot sequence, vendor-provided reference firmware passes AML code to the bootloader that the bootloader can use to generate ACPI data structures for a component. That is, ACPI data structure definitions previously only related by a vendor to a bootloader developer can be supplied to the bootloader by the reference hardware during boot.

These technologies may provide at least the following advantages. First, if the reference firmware is provided in binary form, proprietary or restricted register sets or other aspects of a component can be kept confidential. Second, reference firmware revisions can be readily propagated throughout the bootloader ecosystem. A component vendor can push a reference firmware update to a bootloader vendor or a bootloader vendor can pull a firmware update from, for example, a vendor's online reference firmware repository. Third, bootloaders can be quickly revised. If a bootloader needs to be revised to address a component initialization issue, implement a workaround, or for another reason, a bootloader developer can simply update the appropriate reference firmware and avoid having to undergo a full bootloader rebuild, which can be a lengthy process.

Fourth, if a vendor provides reference checksums or reference hash values for the reference firmware or the ACPI data structures to generated by the reference firmware, the reference firmware and ACPI data structures can be verified and/or authenticated during the boot sequence, which can provide for a verified boot. Fifth, as the reference firmware can be used across different types of bootloaders, there is no duplication of effort by the bootloader developer ecosystem to integrate the same reference firmware across multiple bootloader types. Sixth, by owning, validating, and maintaining the ACPI code (e.g., ASL code, AML code) included in reference firmware by a component vendor, a component vendor can control the generation and population of ACPI data structures, which can reduce the chances of errors being introduced into the ACPI data structures by bootloader vendors. This maintained and validated ACPI code can be reused across different components offered by a vendor, which can further reduce engineering resources spent on developing ACPI code by the bootloader ecosystem and further improve the resiliency of bootloaders and reference firmware.

As used herein, the term "reference firmware" refers to firmware provided by a component vendor and used by a bootloader to initialize the vendor's component. Use of reference firmware to initialize a computing system component can comprise the reference firmware initializing or configuring the component as well as the reference firmware passing AML code to the bootloader for the bootloader to execute to further initialize or configure the integrated circuit component through the generation and population of ACPI data structures.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner "Connected" may indicate elements are in direct physical or electrical contact with each other and "coupled" may indicate elements co-operate or interact with each other, but they may or may not be in direct physical or electrical contact. Terms modified by the word "substantially" include arrangements, orientations, spacings, or positions that vary slightly from the meaning of the unmodified term.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates an example computing system for platform hardening for bootloaders via reference firmware. The computing system 100 comprises a hardware platform 104 and a computing environment 108 created by the computing system 100 during operation. The environment 108 comprises an operating system 112, an ACPI subsystem 116, and a bootloader 120. The ACPI subsystem 116 comprises ACPI tables 128, ACPI definition blocks 129, and an AML interpreter 130. The operating system 112 interfaces with the ACPI subsystem 116 through the ACPI tables 128 and the ACPI definition blocks 129 to configure and manage computing system components, such as SoCs, processing units, fans, cameras, and other components that are part of the hardware platform 104. As such, the computing system 100 can be considered to be an operating system-directed configuration and power management system, or, to employ operating system power management (OSPM) technologies. The ACPI tables 128 and ACPI definition blocks 129 are created during a computing system boot sequence, which comprises activities performed by the computing system 100 from the moment the computing system 100 is turned on until the moment control of the computing system 100 is relinquished by the bootloader 120 to the operating system 112.

The bootloader 120 creates the ACPI tables 128 and the ACPI definition blocks 129 during a computing system boot sequence. The bootloader 120 comprises reference firmware 124 that is provided by one or more component vendors. As described above, the bootloader 120 can be provided by a bootloader developer. The ACPI tables 128 and the ACPI definition blocks 129 can both store data and AML code (e.g., methods, objects) executable by the AML interpreter 130 to control components of the hardware platform 104. The ACPI tables 128 comprise a DSDT 136 and one or more optional SSDTs 140. The bootloader 120 and reference firmware 124 reference a product data structure 144 and one or more hand-off data structures (e.g., hand-off blocks (HOBs)) 148 during a boot sequence.

Figure 2:
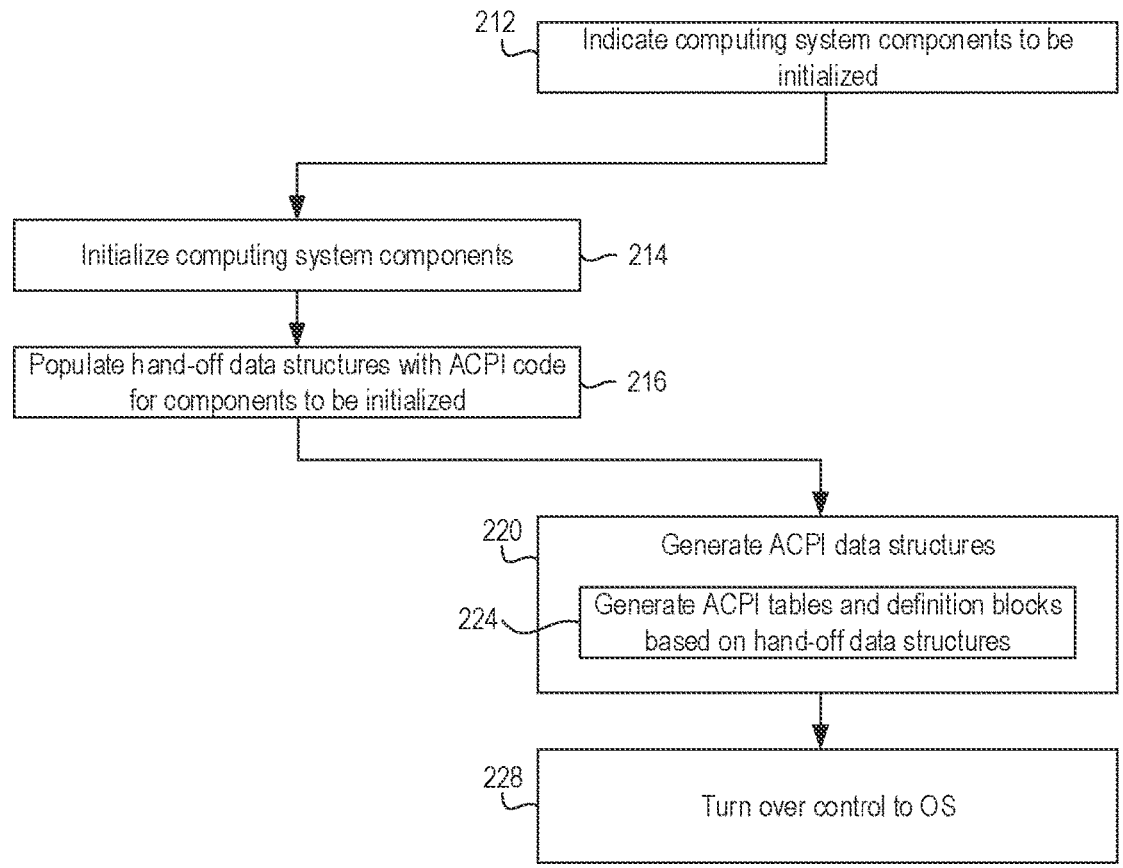
FIG. 2 illustrates an example boot sequence portion utilizing reference firmware to create ACPI data structures.

FIG. 2 illustrates an example boot sequence portion utilizing reference firmware to create ACPI data structures. The boot sequence portion 200 is performed by a bootloader 204, which comprises reference firmware 208. The boot sequence portion 200 comprises a portion of a computing system boot sequence that initializes one or more computing system components (e.g., an SoC) in a computing system and creates ACPI data structures for use by an operating system. The boot sequence portion 200 can be performed by a boot sequence portion that initializes memory is performed.

In some embodiments, the reference firmware is an Intel® firmware support package (FSP) binary that complies with the UEFI Platform Initialization Firmware Volume Specification format and comprises three components (firmware volumes): FSP-T, FSP-M, and FSP-S. The FSP-T component initializes temporary random-access memory (RAM) along with performing other early initialization actions, the FSP-M component initializes permanent memory along with performing other early integrated circuit component initialization actions, and the FSP-S component completes integrated circuit component system component initialization (e.g., SoC, processor units, chipset processing units). In embodiments where the reference firmware 208 comprises an Intel® firmware support package, the elements of the boot sequence portion 200 performed by the reference firmware 208 can be performed by an FSP-S component.

At 212, the bootloader 204 begins integrated circuit component initialization by indicating to the reference firmware 208 which components are to be initialized during the boot sequence. In some embodiments, the bootloader 204 configures a product data structure (e.g., product data structure 144) to indicate to the reference firmware 208 which components are to be initialized. The product data structure can be any type of data structure. In embodiments where the reference firmware 208 is an Intel® FSP, the product data structure can be an updatable product data (UPD) data structure.

The bootloader 204 then passes control to the reference firmware 208, and at 214, the reference firmware 208 initializes the integrated circuit components indicated by the bootloader 204 to be initialized during the boot sequence. Initialization can comprise actions such as programming a fabric used by integrated circuit dies within an integrated circuit component to communicate with each other and assigning a base address register for a component.

At 216, the reference firmware 208 populates hand-off data structures with ACPI code associated with the integrated circuit components indicated by the bootloader 204 to be initialized. The ACPI code inserted into the hand-off data structures can be AML code generated during the boot sequence by the reference firmware compiling ASL code that is part of or accessible to the reference firmware. The inserted ACPI code can also be already-compiled AML code that is part of or accessible to the reference firmware. The already-compiled AML code can be provided by a component vendor or have been generated by the reference firmware during a prior boot sequence. The hand-off data structures allow the reference firmware 208 to pass information to the bootloader 204. In some embodiments, the hand-off data structures are hand-off blobs (HOBs), such as HOBs 148. The ACPI code inserted in the hand-off data structures (e.g., CPU AML code 152, embedded multimedia card (eMMC) AML code 153, integrated graphic device (IGD) AML code 154) is part of or is accessible to the reference firmware 208. The hand-off data structures can be further populated with information to be used by the ACPI code to be executed by the bootloader 204, such as AML code (e.g., methods, objects) to be inserted into the ACPI data structures generated by the bootloader 204. Thus, a first portion of the AML code inserted in the hand-off data structures can be placed in the ACPI data structures created by a second portion of the AML code inserted in the hand-off data structures. In some embodiments, one or more hand-off data structures can be created for each integrated circuit component to be initialized during boot. For example, referring back to FIG. 1, the HOBs 148 comprises a for the CPU HOB, an eMMC controller HOB, and an IGD HOB. Each hand-off data structure can comprise a component identifier that identifies the integrated circuit component associated with the AML code in the hand-off data structure. In some embodiments, the component identifier can be a globally unique identifier (GUID), such as GUID 160.

In some embodiments, the reference firmware 208 can configure a global non-volatile storage (GNVS) data structure based on the information in the product data structure that indicates which components are to be initialized during a boot sequence. The GNVS data structure indicates to the operating system the ACPI devices that are available to the operating system at runtime. In some embodiments, the reference firmware 208 can determine which components to initialize based on information in a GNVS data structure.

After populating the hand-off data structures, the reference firmware 208 returns control to the bootloader 204. At 220, the bootloader 204 generates ACPI data structures, such as Fixed ACPI Description Table (FADT), DSDT, and SSDT tables; and a Root System Description Pointer (RSDP). As part of creating the ACPI data structures, at 224, the bootloader 204 executes the AML code contained in the hand-off data structures to generate and populate the ACPI tables and definition blocks associated with the integrated circuit components indicated by the bootloader 204 to be initialized during the boot sequence. The ACPI data structures generated by the bootloader 204 can comprise AML code passed to the bootloader 204 from the reference firmware 208 via the hand-off data structures, and that is executed by an AML interpreter during operation of the computing system to manage computing system resources. The bootloader can traverse the hand-off data structures provided by the reference firmware 208 and utilize the component identifiers located in the hand-off data structures to identify the AML code the bootloader 204 is to execute as part of the boot sequence.

Once the initialization of the integrated circuit components is complete, the bootloader 204 can perform any additional actions that are needed to complete the boot sequence, such as configuring platform-level devices, such as trackpads, cameras, touch displays, etc. In some embodiments, the bootloader 204 ACPI platform devices as children to the integrated circuit components in the ACPI namespace and updates the ACPI table lengths and checksums. Once the boot sequence is completed, at 228, the bootloader 204 turns over control of the computing system to the operating system.

The boot sequence portion 200 can be further illustrated with an example in which an eMMC controller in an Intel® SoC is initialized during a boot sequence by a bootloader comprising an Intel® FSP. At 212, the bootloader configures a UPD data structure to indicate to the FSP that the eMMC is to be initialized as part of the boot sequence. The bootloader then calls the FSP-S component of the FSP. At 214, the FSP performs a series of actions to initialize the eMMC controller, including assigning temporary base address registers to inform the eMMC of its address mapping, enabling SoC general-purpose I/Os (GPIOs) for use by the eMMC, and programming an Intel® on-chip system fabric (IOSF) and an IOSF to Open Core Protocol (IOSF-OCP) bridge to allow the eMMC to communicate with other integrated circuit dies on the SoC. At 216, the FSP populates an eMMC HOB with AML code included in the FSP that will generate and populate ACPI tables and definition blocks associated with the eMMC. This eMMC-associated AML code is part of the FSP. The eMMC HOB includes a GUID associated with the eMMC controller. The FSP can also populate a GNVS structure based on the UPD. After the eMMC HOB is created, the FSP call completes, and control of the boot sequence is returned to the bootloader. At 220, the bootloader utilizes the eMMC GUID to identify the eMMC HOB as the HOB associated with the eMMC controller and executes the AML code located in the eMMC HOB to create ACPI tables and definition blocks associated with the eMMC controller.

In some embodiments, the reference firmware can be verified or authenticated by the bootloader. For example, checksums and/or hash values for the reference firmware (reference firmware reference checksums, reference firmware reference hash values) can be provided by a component vendor along with the reference firmware. During a boot sequence, the bootloader can confirm that no changes have been made to the reference firmware prior to the bootloader executing the reference firmware by generating checksums and/or hash values (reference firmware boot sequence checksums, reference firmware boot sequence hash values) based on the reference firmware to the reference firmware reference checksums and/or reference firmware reference hash values.

In some embodiments, checksums and/or hash values can be provided with the reference firmware for ACPI tables (ACPI table reference checksums, ACPI table reference hash values) and/or definition blocks (ACPI definition block reference checksums, ACPI definition block reference hash values) to be generated by the reference firmware. During a boot sequence, the bootloader can generate checksums and/or hash values for the generated ACPI tables (ACPI table boot sequence checksums, ACPI table boot sequence hash values) and/or definition block (ACPI definition block boot sequence checksums, ACPI definition block boot sequence hash values) and check them against the checksums and/or hash values provided with the reference firmware for the ACPI tables and/or definition blocks to ensure that no changes have been made to the reference firmware before the bootloader hands over control of the computing system to the operating system.

In some embodiments, the bootloader can authenticate the reference firmware prior to executing the reference firmware as part of a boot sequence. For example, the reference firmware can be provided with a signature and a public key. The signature can be a hash value of the reference firmware and encrypted using a private key that is paired with the public key provided by the component vendor with the reference firmware. Thus, the bootloader can authenticate the reference firmware by decrypting the signature with the public key and compare the resulting decrypted hash value provided with the reference firmware to a hash value generated by the bootloader using the same cryptographic hash function used to in generating the signature on the reference firmware included in the production bootloader.

If verification or authentication of the reference firmware, ACPI tables, or ACPI definition blocks fails, the bootloader can not complete the boot sequence. In some embodiments, the bootloader can provide a warning to the user that the reference firmware cannot be verified or authenticated and prompt a user of the computing system if they wish to continue with the boot sequence.

Figure 3:
FIG. 3 is an example method of utilizing reference firmware to generate ACPI data structures during a computing system boot sequence.

FIG. 3 is an example method of utilizing reference firmware to generate ACPI data structures during a computing system boot sequence. The method 300 can be performed by, for example, a laptop computing system. At 310, one or more computing system components to be initialized during a computing system boot sequence are indicated by a bootloader to reference firmware. At 320, one or more hand-off data structures comprising Advanced Configuration and Power Interface (ACPI) machine language (AML) code associated with the one or more computing system components to be initialized and passed from the reference firmware to the bootloader. At 330, the AML code associated with the one or more computing system components to generate one or more ACPI data structures associated with the one or more computing system components is executed by the bootloader.

The technologies described herein can be performed by or implemented in any of a variety of computing systems, including mobile computing systems (e.g., smartphones, handheld computers, tablet computers, laptop computers, portable gaming consoles, 2-in-1 convertible computers, portable all-in-one computers), non-mobile computing systems (e.g., desktop computers, servers, workstations, stationary gaming consoles, set-top boxes, smart televisions, rack-level computing solutions (e.g., blade, tray, or sled computing systems)), and embedded computing systems (e.g., computing systems that are part of a vehicle, smart home appliance, consumer electronics product or equipment, manufacturing equipment). As used herein, the term "computing system" includes computing devices and includes systems comprising multiple discrete physical components. In some embodiments, the computing systems are located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

Figure 4:
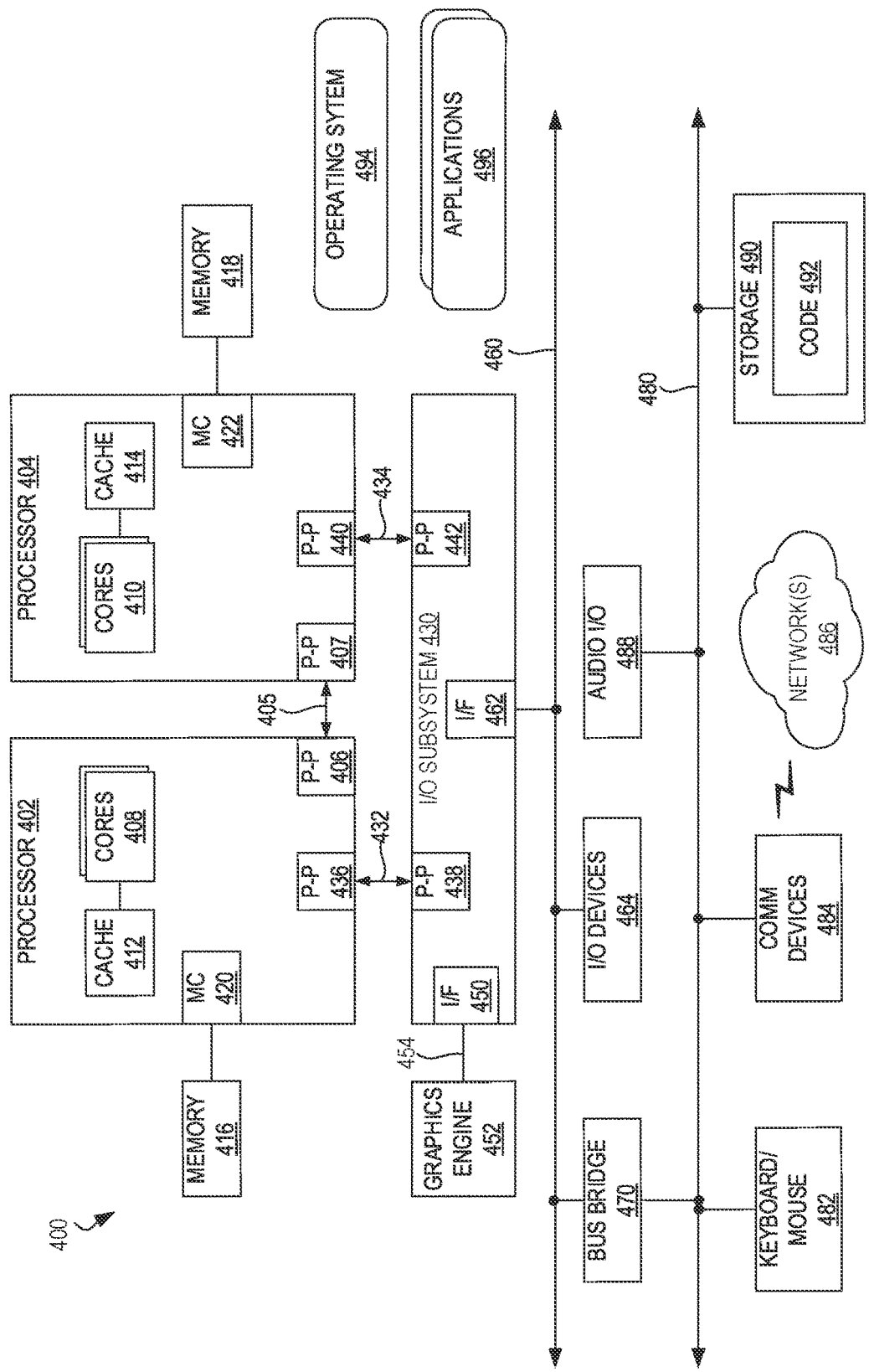
FIG. 4 is a block diagram of an example computing system in which technologies described herein may be implemented.

FIG. 4 is a block diagram of an example computing system in which technologies described herein may be implemented. Generally, components shown in FIG. 4 can communicate with other shown components, although not all connections are shown, for ease of illustration. The computing system 400 is a multiprocessor system comprising a first processor unit 402 and a second processor unit 404 comprising point-to-point (P-P) interconnects. A point-to-point (P-P) interface 406 of the processor unit 402 is coupled to a point-to-point interface 407 of the processor unit 404 via a point-to-point interconnection 405. It is to be understood that any or all of the point-to-point interconnects illustrated in FIG. 4 can be alternatively implemented as a multi-drop bus, and that any or all buses illustrated in FIG. 4 could be replaced by point-to-point interconnects.

The processor units 402 and 404 comprise multiple processor cores. Processor unit 402 comprises processor cores 408 and processor unit 404 comprises processor cores 410. Processor cores 408 and 410 can execute computer-executable instructions in a manner similar to that discussed below in connection with FIG. 8, or other manners.

Processor units 402 and 404 further comprise cache memories 412 and 414, respectively. The cache memories 412 and 414 can store data (e.g., instructions) utilized by one or more components of the processor units 402 and 404, such as the processor cores 408 and 410. The cache memories 412 and 414 can be part of a memory hierarchy for the computing system 400. For example, the cache memories 412 can locally store data that is also stored in a memory 416 to allow for faster access to the data by the processor unit 402. In some embodiments, the cache memories 412 and 414 can comprise multiple cache levels, such as level 1 (L1), level 2 (L2), level 3 (L3), level 4 (L4), and/or other caches or cache levels, such as a last level cache (LLC). Some of these cache memories (e.g., L2, L3, L4, LLC) can be shared among multiple cores in a processor unit. One or more of the higher levels of cache levels (the smaller and faster caches) in the memory hierarchy can be located on the same integrated circuit die as a processor core and one or more of the lower cache levels (the larger and slower caches) can be located on an integrated circuit dies that are physically separate from the processor core integrated circuit dies.

Although the computing system 400 is shown with two processor units, the computing system 400 can comprise any number of processor units. Further, a processor unit can comprise any number of processor cores. A processor unit can take various forms such as a central processing unit (CPU), a graphics processing unit (GPU), general-purpose GPU (GPGPU), accelerated processing unit (APU), field-programmable gate array (FPGA), neural network processing unit (NPU), data processor unit (DPU), accelerator (e.g., graphics accelerator, digital signal processor (DSP), compression accelerator, artificial intelligence (AI) accelerator), controller, or other types of processing units. As such, the processor unit can be referred to as an XPU (or xPU). Further, a processor unit can comprise one or more of these various types of processing units. In some embodiments, the computing system comprises one processor unit with multiple cores, and in other embodiments, the computing system comprises a single processor unit with a single core. As used herein, the terms "processor unit" and "processing unit" can refer to any processor, processor core, component, module, engine, circuitry, or any other processing element described or referenced herein.

In some embodiments, the computing system 400 can comprise one or more processor units that are heterogeneous or asymmetric to another processor unit in the computing system. There can be a variety of differences between the processing units in a system in terms of a spectrum of metrics of merit including architectural, microarchitectural, thermal, power consumption characteristics, and the like. These differences can effectively manifest themselves as asymmetry and heterogeneity among the processor units in a system.

The processor units 402 and 404 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogeneity or asymmetric can be among processor units located in the same integrated circuit component. In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Processor units 402 and 404 further comprise memory controller logic (MC) 420 and 422. As shown in FIG. 4, MCs 420 and 422 control memories 416 and 418 coupled to the processor units 402 and 404, respectively. The memories 416 and 418 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 420 and 422 are illustrated as being integrated into the processor units 402 and 404, in alternative embodiments, the MCs can be external to a processor unit.

Processor units 402 and 404 are coupled to an Input/Output (I/O) subsystem 430 via point-to-point interconnections 432 and 434. The point-to-point interconnection 432 connects a point-to-point interface 436 of the processor unit 402 with a point-to-point interface 438 of the I/O subsystem 430, and the point-to-point interconnection 434 connects a point-to-point interface 440 of the processor unit 404 with a point-to-point interface 442 of the I/O subsystem 430. Input/Output subsystem 430 further includes an interface 450 to couple the I/O subsystem 430 to a graphics engine 452. The I/O subsystem 430 and the graphics engine 452 are coupled via a bus 454.

The Input/Output subsystem 430 is further coupled to a first bus 460 via an interface 462. The first bus 460 can be a Peripheral Component Interconnect Express (PCIe) bus or any other type of bus. Various I/O devices 464 can be coupled to the first bus 460. A bus bridge 470 can couple the first bus 460 to a second bus 480. In some embodiments, the second bus 480 can be a low pin count (LPC) bus. Various devices can be coupled to the second bus 480 including, for example, a keyboard/mouse 482, audio I/O devices 488, and a storage device 490, such as a hard disk drive, solid-state drive, or another storage device for storing computer-executable instructions (code) 492 or data. The code 492 can comprise computer-executable instructions for performing methods described herein. Additional components that can be coupled to the second bus 480 include communication device(s) 484, which can provide for communication between the computing system 400 and one or more wired or wireless networks 486 (e.g. Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 402.11 standard and its supplements).

In embodiments where the communication devices 484 support wireless communication, the communication devices 484 can comprise wireless communication components coupled to one or more antennas to support communication between the computing system 400 and external devices. The wireless communication components can support various wireless communication protocols and technologies such as Near Field Communication (NFC), IEEE 1002.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 4G broadband cellular technologies. In addition, the wireless modems can support communication with one or more cellular networks for data and voice communications within a single cellular network, between cellular networks, or between the computing system and a public switched telephone network (PSTN).

The system 400 can comprise removable memory such as flash memory cards (e.g., SD (Secure Digital) cards), memory sticks, Subscriber Identity Module (SIM) cards). The memory in system 400 (including caches 412 and 414, memories 416 and 418, and storage device 490) can store data and/or computer-executable instructions for executing a boot sequence, an operating system 494, and application programs 496. Example data includes web pages, text messages, images, sound files, and video to be sent to and/or received from one or more network servers or other devices by the system 400 via the one or more wired or wireless networks 486, or for use by the system 400. The system 400 can also have access to external memory or storage (not shown) such as external hard drives or cloud-based storage.

The operating system 494 can control the allocation and usage of the components illustrated in FIG. 4 and support the one or more application programs 496. The application programs 496 can include common computing system applications (e.g., email applications, calendars, contact managers, web browsers, messaging applications) as well as other computing applications.

The computing system 400 can support various additional input devices, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 400. External input and output devices can communicate with the system 400 via wired or wireless connections.

In addition, the computing system 400 can provide one or more natural user interfaces (NUIs). For example, the operating system 494 or applications 496 can comprise speech recognition logic as part of a voice user interface that allows a user to operate the system 400 via voice commands. Further, the computing system 400 can comprise input devices and logic that allows a user to interact with computing the system 400 via body, hand, or face gestures.

The system 400 can further include at least one input/output port comprising physical connectors (e.g., USB, IEEE 1394 (FireWire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 400 can further comprise one or more additional antennas coupled to one or more additional receivers, transmitters, and/or transceivers to enable additional functions.

It is to be understood that FIG. 4 illustrates only one example computing system architecture. Computing systems based on alternative architectures can be used to implement technologies described herein. For example, instead of the processors 402 and 404 and the graphics engine 452 being located on discrete integrated circuits, a computing system can comprise an SoC (system-on-a-chip) integrated circuit incorporating multiple processors, a graphics engine, and additional components. Further, a computing system can connect its constituent component via bus or point-to-point configurations different from that shown in FIG. 4. Moreover, the illustrated components in FIG. 4 are not required or all-inclusive, as shown components can be removed and other components added in alternative embodiments.

Figure 5:
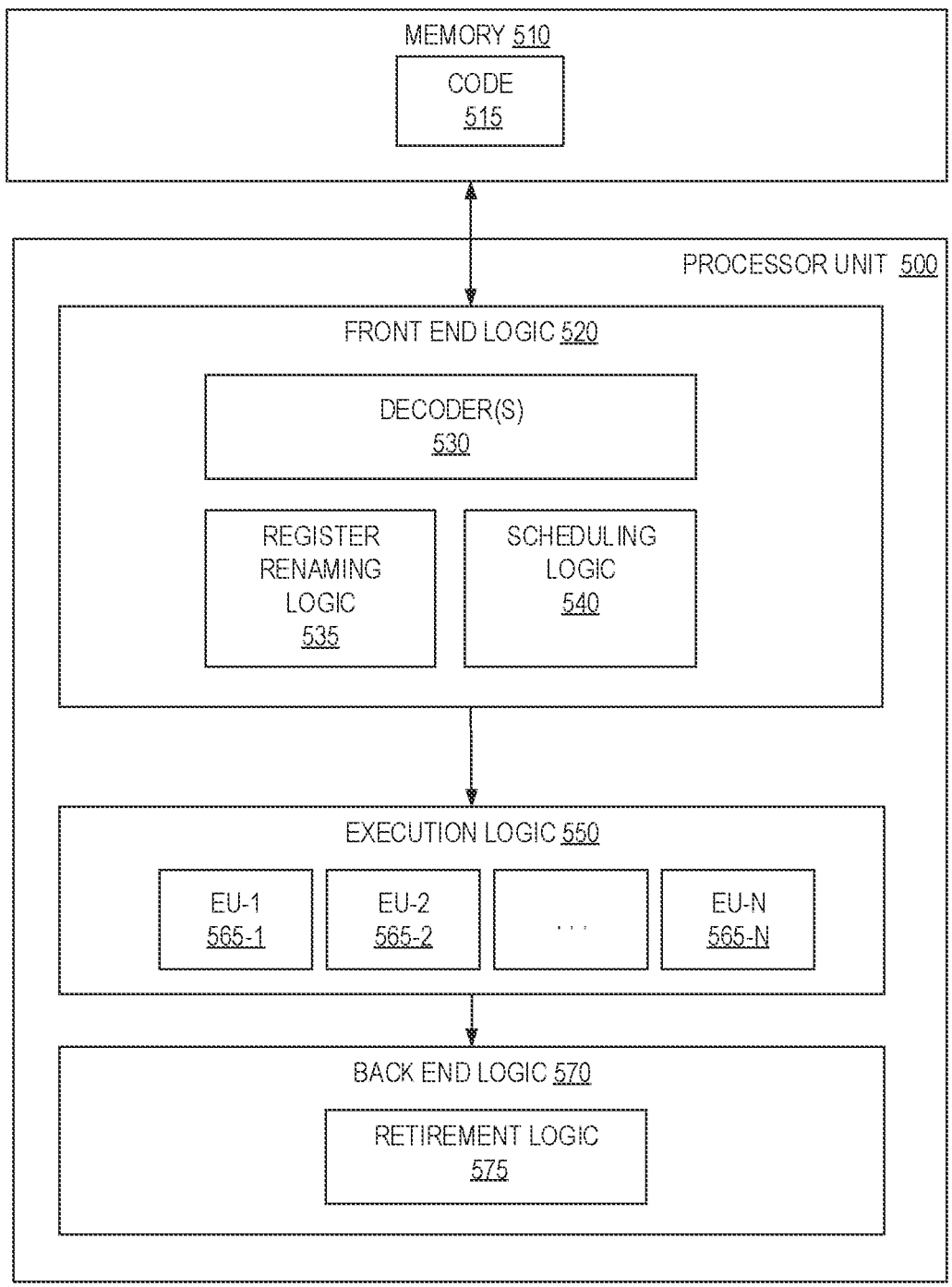
FIG. 5 is a block diagram of an example processor unit to execute computer-executable instructions as part of implementing technologies described herein.

FIG. 5 is a block diagram of an example processor unit to execute computer-executable instructions as part of implementing technologies described herein. The processor unit 500 can be a single-threaded core or a multithreaded core in that it may include more than one hardware thread context (or "logical processor") per processor unit.

FIG. 5 also illustrates a memory 510 coupled to the processor unit 500. The memory 510 can be any memory described herein or any other memory known to those of skill in the art. The memory 510 can store computer-executable instructions 515 (code) executable by the processor core 500.

The processor unit comprises front-end logic 520 that receives instructions from the memory 510. An instruction can be processed by one or more decoders 530. The decoder 530 can generate as its output a micro-operation such as a fixed width micro operation in a predefined format, or generate other instructions, microinstructions, or control signals, which reflect the original code instruction. The front-end logic 520 further comprises register renaming logic 535 and scheduling logic 540, which generally allocate resources and queues operations corresponding to converting an instruction for execution.

The processor unit 500 further comprises execution logic 550, which comprises one or more execution units (EUs) 565-1 through 565-N. Some processor unit embodiments can include a number of execution units dedicated to specific functions or sets of functions. Other embodiments can include only one execution unit or one execution unit that can perform a particular function. The execution logic 550 performs the operations specified by code instructions. After completion of execution of the operations specified by the code instructions, back-end logic 570 retires instructions using retirement logic 575. In some embodiments, the processor unit 500 allows out of order execution but requires in-order retirement of instructions. Retirement logic 575 can take a variety of forms as known to those of skill in the art (e.g., re-order buffers or the like).

The processor unit 500 is transformed during execution of instructions, at least in terms of the output generated by the decoder 530, hardware registers and tables utilized by the register renaming logic 535, and any registers (not shown) modified by the execution logic 550.

As used herein, the term "module" refers to logic that may be implemented in a hardware component or device, software or firmware running on a processor unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processor units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processor units capable of executing computer-executable instructions to perform any of the disclosed methods. As used herein, the term "computer" refers to any computing system, device, or machine described or mentioned herein as well as any other computing system, device, or machine capable of executing instructions. Thus, the term "computer-executable instruction" refers to instructions that can be executed by any computing system, device, or machine described or mentioned herein as well as any other computing system, device, or machine capable of executing instructions.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some embodiments, any of the methods herein can be performed by a combination of non-programmable hardware components and one or more processing units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

As used in this application and the claims, a list of items joined by the term "and/or" can mean any combination of the listed items. For example, the phrase "A, B and/or C" can mean A; B; C; A and B; A and C; B and C; or A, B and C. As used in this application and the claims, a list of items joined by the term "at least one of" can mean any combination of the listed terms. For example, the phrase "at least one of A, B or C" can mean A; B; C; A and B; A and C; B and C; or A, B, and C. Moreover, as used in this application and the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 is a method comprising: indicating to reference firmware, by a bootloader, one or more components of a computing system to be initialized during a computing system boot sequence; passing, by the reference firmware to the bootloader, one or more hand-off data structures comprising Advanced Configuration and Power Interface (ACPI) machine language (AML) code associated with the one or more components of the computing system to be initialized; and executing, by the bootloader, the AML code associated with the one or more components of the computing system to generate one or more ACPI data structures associated with the one or more components of the computing system.

Example 2 comprises the method of Example 1, further comprising the reference firmware compiling ACPI source code (ASL) during the computing system boot sequence to generate the AML code.

Example 3 comprises the method of Example 1 or 2, further comprising relinquishing control of the computing system to an operating system at the end of the computing system boot sequence.

Example 4 comprises the method of any one of Examples 1-3, wherein the ACPI data structures comprise one or more ACPI definition blocks.

Example 5 comprises the method of any one of Examples 1-4, wherein the ACPI data structures comprise a portion of the AML code provided to the bootloader by the reference firmware via the one or more hand-off data structures.

Example 6 comprises the method of any one of Examples 1-5, wherein the one or more components of the computing system comprise a system on a chip (SoC).

Example 7 comprises the method of any one of Examples 1-6, wherein the one or more ACPI data structures comprise a differentiated system description table (DSDT).

Example 8 comprises the method of any one of Examples 1-7, wherein the one or more ACPI data structures comprise one or more secondary system description tables (SSDTs).

Example 9 comprises the method of any one of Examples 1-8, further comprising the reference firmware generating the hand-off data structures.

Example 10 comprises the method of any one of Examples 1-9, further comprising the bootloader verifying the reference firmware prior to execution of the reference firmware, the verifying the reference firmware comprising comparing reference firmware boot sequence hash values calculated by the bootloader during the computing system boot sequence for the reference firmware against reference firmware reference hash values and/or comparing reference firmware boot sequence checksums generated by the bootloader during the computing system boot sequence for the reference firmware against reference firmware reference checksums.

Example 11 comprises the method of Example 10, further comprising not completing the computing system boot sequence if the reference firmware is not verified.

Example 12 comprises the method of any one of Examples 1-11, wherein the ACPI data structures comprise one or more ACPI tables, the method further comprising the bootloader verifying the ACPI tables by comparing ACPI table boot sequence hash values calculated by the bootloader during the computing system boot sequence for the ACPI tables against ACPI table reference hash values and/or comparing ACPI table boot sequence checksums generated by the bootloader during the computing system boot sequence for the ACPI tables against ACPI table reference checksums.

Example 13 comprises the method of Example 12, further comprising not completing the computing system boot sequence if the ACPI tables are not verified.

Example 14 comprises the method of any one of Examples 1-13, wherein the ACPI data structures comprise one or more ACPI definition blocks, the method further comprising the bootloader verifying the ACPI definition blocks by comparing ACPI definition block boot sequence hash values calculated by the bootloader during the computing system boot sequence for the ACPI definition blocks against ACPI definition block reference hash values and/or comparing ACPI definition block boot sequence checksums generated by the bootloader during the computing system boot sequence for the ACPI definition blocks against ACPI definition block reference checksums.

Example 15 comprises the method of Example 14, further comprising not completing the computing system boot sequence if the ACPI definition blocks are not verified.

Example 16 comprises the method of any one of Examples 1-15, further comprising, the bootloader authenticating the reference firmware prior to executing the reference firmware and executing the reference firmware if the reference firmware is authenticated.

Example 17 is one or more computer-readable storage media storing computer-executable instructions that, when executed, cause a computing system to perform any one of the methods of Examples 1-16.

Example 18 is an apparatus comprising a means to perform any one of the Examples of Examples 1-16.

Example 19 is one or more non-transitory computer-readable storage media storing computer-executable instructions that, when executed, cause a computing system to perform a method, the method comprising: initializing one or more components of a computing system during a computing system boot sequence; and passing one or more hand-off data structures comprising Advanced Configuration and Power Interface (ACPI) machine language (AML) code associated with the one or more components of the computing system to a bootloader.

Example 20 comprises the one or more non-transitory computer-readable storage media of Example 19, the method further comprising compiling ACPI source code (ASL) during the computing system boot sequence to generate the AML code.

Example 21 comprises the one or more non-transitory computer-readable storage media of Examples 19 or 20, wherein the AML code, when executed by the bootloader, causes the computing system to generate one or more ACPI data structures associated with the one or more components of the computing system.

Example 22 comprises the one or more non-transitory computer-readable storage media of any one of Examples 19-21, wherein the one or more ACPI data structures comprise a differentiated system description table (DSDT).

Example 23 comprises the one or more non-transitory computer-readable storage media of any one of Examples 19-22, wherein the one or more ACPI data structures comprise one or more secondary system description tables (SSDTs).

Example 24 comprises the one or more non-transitory computer-readable storage media of any one of Examples 19-23, wherein the one or more ACPI data structures comprise one or more ACPI definition blocks.

Example 25 comprises the one or more non-transitory computer-readable storage media of any one of Examples 19-24, wherein the one or more components of the computing system comprise a system on a chip (SoC).

Example 26 is a system, comprising: one or more processing units; and one or more non-transitory computer-readable storage media storing computer-executable instructions that, when executed, cause a computing system to perform any one of the methods of Examples 1-16.

We claim:

1. A method comprising:
indicating to reference firmware, by a bootloader, one or more components of a computing system to be initialized during a computing system boot sequence;
passing, by the reference firmware to the bootloader, one or more hand-off data structures comprising Advanced Configuration and Power Interface (ACPI) machine language (AML) code associated with the one or more components of the computing system to be initialized; and
executing, by the bootloader, the AML code associated with the one or more components of the computing system to generate one or more ACPI data structures associated with the one or more components of the computing system.

2. The method of claim 1, further comprising the reference firmware compiling ACPI source code (ASL) during the computing system boot sequence to generate the AML code.

3. The method of claim 1, wherein the ACPI data structures comprise a portion of the AML code provided to the bootloader by the reference firmware via the one or more hand-off data structures.

4. The method of claim 1, wherein the one or more components of the computing system comprise a system on a chip (SoC).

5. The method of claim 1, further comprising the reference firmware generating the hand-off data structures.

6. The method of claim 1, further comprising the bootloader verifying the reference firmware prior to execution of the reference firmware, the verifying the reference firmware comprising comparing reference firmware boot sequence hash values calculated by the bootloader during the computing system boot sequence for the reference firmware against reference firmware reference hash values and/or comparing reference firmware boot sequence checksums generated by the bootloader during the computing system boot sequence for the reference firmware against reference firmware reference checksums.

7. The method of claim 6, further comprising not completing the computing system boot sequence if the reference firmware is not verified.

8. The method of claim 1, further comprising, the bootloader authenticating the reference firmware prior to executing the reference firmware and executing the reference firmware if the reference firmware is authenticated.

9. One or more non-transitory computer-readable storage media storing computer-executable instructions that, when executed, cause a computing system to perform a method, the method comprising:
indicating to reference firmware, by a bootloader, one or more components of a computing system to be initialized during a computing system boot sequence;
passing, by the reference firmware to the bootloader, one or more hand-off data structures comprising Advanced Configuration and Power Interface (ACPI) machine language (AML) code associated with the one or more components of the computing system to be initialized; and
executing, by the bootloader, the AML code associated with the one or more components of the computing system to generate one or more ACPI data structures associated with the one or more components of the computing system.

10. The one or more non-transitory computer-readable storage media of claim 9, the method further comprising reference firmware compiling ACPI source code (ASL) during the computing system boot sequence to generate the AML code.

11. The one or more non-transitory computer-readable storage media of claim 9, wherein the ACPI data structures comprise a portion of the AML code provided to the bootloader by the reference firmware via the one or more hand-off data structures.

12. The one or more non-transitory computer-readable storage media of claim 9, the method further comprising the reference firmware generating the hand-off data structures.

13. The one or more non-transitory computer-readable storage media of claim 9, wherein the ACPI data structures comprise one or more ACPI tables, the method further comprising the bootloader verifying the ACPI tables by comparing ACPI table boot sequence hash values calculated by the bootloader during the computing system boot sequence for the ACPI tables against ACPI table reference hash values and/or comparing ACPI table boot sequence checksums generated by the bootloader during the computing system boot sequence for the ACPI tables against ACPI table reference checksums.

14. The one or more non-transitory computer-readable storage media of claim 13, the method further comprising not completing the computing system boot sequence if the ACPI tables are not verified.

15. The one or more non-transitory computer-readable storage media of claim 9, wherein the ACPI data structures comprise one or more ACPI definition blocks, the method further comprising the bootloader verifying the ACPI definition blocks by comparing ACPI definition block boot sequence hash values calculated by the bootloader during the computing system boot sequence for the ACPI definition blocks against ACPI definition block reference hash values and/or comparing ACPI definition block boot sequence checksums generated by the bootloader during the computing system boot sequence for the ACPI definition blocks against ACPI definition block reference checksums.

16. The one or more non-transitory computer-readable storage media of claim 15, the method further comprising not completing the computing system boot sequence if the ACPI definition blocks are not verified.

17. A system, comprising:
one or more processing units; and
one or more non-transitory computer-readable storage media storing computer-executable instructions that, when executed, cause a computing system to perform a method, the method comprising:
indicating to reference firmware, by a bootloader, one or more components of a computing system to be initialized during a computing system boot sequence;
passing, by the reference firmware to the bootloader, one or more hand-off data structures comprising Advanced Configuration and Power Interface (ACPI) machine language (AML) code associated with the one or more components of the computing system to be initialized; and executing, by the bootloader, the AML code associated with the one or more components of the computing system to generate one or more ACPI data structures associated with the one or more components of the computing system.

18. The system of claim 17, the method further comprising the reference firmware compiling ACPI source code (ASL) during the computing system boot sequence to generate the AML code.

19. The system of claim 17, wherein the ACPI data structures comprise a portion of the AML code provided to the bootloader by the reference firmware via the one or more hand-off data structures.

20. The system of claim 17, wherein the one or more components of the computing system comprise a system on a chip (SoC).

21. The system of claim 17, the method further comprising:

the bootloader verifying the reference firmware prior to execution of the reference firmware, the verifying the reference firmware comprising comparing reference firmware boot sequence hash values calculated by the bootloader during the computing system boot sequence for the reference firmware against reference firmware reference hash values and/or comparing reference firmware boot sequence checksums generated by the bootloader during the computing system boot sequence for the reference firmware against reference firmware reference checksums; and not completing the computing system boot sequence if the reference firmware is not verified.

22. The system of claim 17, the method further comprising, the bootloader authenticating the reference firmware prior to executing the reference firmware and executing the reference firmware if the reference firmware is authenticated.

23. One or more non-transitory computer-readable storage media storing computer-executable instructions that, when executed, cause a computing system to perform a method, the method comprising:

initializing one or more components of a computing system during a computing system boot sequence; and passing one or more hand-off data structures comprising Advanced Configuration and Power Interface (ACPI) machine language (AML) code associated with the one or more components of the computing system to a bootloader.

24. The one or more non-transitory computer-readable storage media of claim 23, the method further comprising compiling ACPI source code (ASL) during the computing system boot sequence to generate the AML code.

25. The one or more non-transitory computer-readable storage media of claim 23, wherein the AML code, when executed by the bootloader, causes the computing system to generate one or more ACPI data structures associated with the components of the computing system.

* * * * *